(12) United States Patent
Varadarajan et al.

(10) Patent No.: US 12,347,192 B2
(45) Date of Patent: Jul. 1, 2025

(54) METHODS AND SYSTEMS FOR IMPROVING DVS FEATURES FOR COMPUTER VISION APPLICATIONS

(71) Applicant: SAMSUNG ELECTRONICS CO., LTD., Suwon-si (KR)

(72) Inventors: Srenivas Varadarajan, Bangalore (IN); Anamika Sharma, Madhya Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 913 days.

(21) Appl. No.: 17/390,358

(22) Filed: Jul. 30, 2021

(65) Prior Publication Data

US 2022/0036082 A1    Feb. 3, 2022

(30) Foreign Application Priority Data

Jul. 30, 2020   (IN) .............................. 202041032780

(51) Int. Cl.
  *G06T 7/246*    (2017.01)
  *G06T 5/92*     (2024.01)
  *G06V 20/40*    (2022.01)

(52) U.S. Cl.
  CPC ................ *G06V 20/40* (2022.01); *G06T 5/92* (2024.01); *G06T 7/246* (2017.01); *G06T 2207/10024* (2013.01); *G06V 20/44* (2022.01)

(58) Field of Classification Search
  CPC .................................................... G06T 7/246
  USPC ......................................................... 382/103
  See application file for complete search history.

(56) References Cited

U.S. PATENT DOCUMENTS 10,839,547 B2    11/2020  Gupta et al.

FOREIGN PATENT DOCUMENTS

| CN | 110415344 A | 11/2019 | |
| CN | 111133473 A | 5/2020 | |
| WO | WO-2020163663 A1 * | 8/2020 | ......... G02B 27/0093 |

(Continued)

OTHER PUBLICATIONS

Bryner et al., "Event-based, Direct Camera Tacking from a Photometric 3D Map using Nonliner Optimization," IEEE International Conference on Robotics and Automation (ICRA), Montreal, 2019, (8 pages).

(Continued)

*Primary Examiner* — Ayodeji O Ayotunde
(74) *Attorney, Agent, or Firm* — Sughrue Mion, PLLC

(57) ABSTRACT

The disclosure relates to methods and systems for non-linear mapping of motion-compensated DVS events to DVS images. In the non-linear mapping of motion-compensated DVS events to DVS images, the current pixel increments depend on the existing number of accumulated events at that location. Further, the initial events are given a larger weightage to preserve the tracked features which are used for bundle adjustment. Further, disclosure relates to methods and systems for representing polarity in single channel DVS Frame. As the polarity adds additional constraints on feature matching and therefore accurate optical flow is seen in the image. Moreover, disclosure relates to methods and systems for using event-density as a measure of input contrast after DVS event accumulation and this is used to determine the target range for contrast stretching.

8 Claims, 17 Drawing Sheets

(56) References Cited

FOREIGN PATENT DOCUMENTS

WO WO-2020219619 A1 * 10/2020 ............. G06T 5/009

OTHER PUBLICATIONS

Gehrig et al., "Asynchronous, Photometric Feature Tracking using Events and Frames," ECCV, Munich, 2018 (22 pages).

Vidal et al., "Ultimate SLAM? Combining Events, Images, and IMU for Robust Visual SLAM in HDR and High Speed Scenarios," IEEE Robotics and Automation Letters, Preprint Version, vol. 3, No. 2, Dec. 4, 2017, (10 pages).

Gehrig et al., "EKLT: Asynchronous Photometric Feature Tracking Using Events and Frames," International Journal of Computer Vision, Springer Science+Business Media, LLC, Aug. 5, 2019, (18 pages).

Alzugaray et al., "Asynchronous Corner Detection and Tracking for Event Cameras in Real-Time," IEEE Robotics and Automation Letters, Jun. 11, 2018, (8 pages).

Lagorce et al., "HOTS: A Hierarchy of Event-Based Time-Surfaces for Pattern Recognition," IEEE Transactions on Pattern Analysis and Machine Intelligence, vol. 39, No. 7, Jun. 12, 2017, (14 pages).

Manderscheid et al., "Speed Invariant Time Surface for Learning to Detect Corner Points with Event-Based Cameras," CVF, IEEE Xplore, 2019, (10 pages).

Gallego et al., "A Unifying Contrast Maximization Framework for Event Cameras, with Applications to Motion, Depth, and Optical Flow Estimation," CVF, IEEE Xplore, 2018, (10 pages).

Mitrokhin et al., "Event-based Moving Object Detection and Tracking," 2018 IEEE/RSJ International Conference on Intelligent Robots and Systems (IROS), Madrid, 2018.

Horstschaefer et al., "Real-time Visual-Inertial Odometry for Event Cameras using Keyframe-based Nonlinear Optimization," Event-Based Visual-Inertial Odometry, BMVC, 2017, (12 pages).

Gallego et al., "Event-based Vision: A Survey," Feb. 27, 2020, (30 pages).

* cited by examiner

METHODS AND SYSTEMS FOR IMPROVING DVS FEATURES FOR COMPUTER VISION APPLICATIONS

CROSS-REFERENCE TO RELATED APPLICATIONS

This application is based on and claims priority under 35 U.S.C. § 119 to Indian Patent Application No. 202041032780, filed on Jul. 30, 2020, in the Indian Patent Office, the disclosure of which are incorporated herein by reference in its entirety.

BACKGROUND

1. Field

The disclosure relates to the devices, methods and systems for improving Dynamic Vision Sensor (DVS) features for accurate computer vision applications.

2. Description of the Related Art

A Dynamic Vision Sensor (DVS) is an event camera, which captures the changes in pixel intensities asynchronously. The DVS is used for mobile, gaming and ADAS applications. In comparison to a Complementary Metal Oxide Semiconductor (CMOS) image sensor (CIS), a DVS has the advantages of higher data-rate (1000 Hz), higher dynamic range (140 db) and low-power. Moreover, a DVS is extremely useful for accurately capturing fast scene changes, especially for recovering otherwise lost information between 2 successive CIS Frames. Accordingly, the DVS is useful in computer-vision applications like Simultaneous Localization and Mapping (SLAM).

FIG. 1 illustrates a 3D reconstruction of a house from video-scans recorded by a moving camera through the SLAM technology. SLAM is used for both localization and mapping. The localization is to locate a person or artificial object such as drone or Internet of Things (IoT) device in the house and the mapping is to construct 3D scene structure of the house.

FIG. 2 illustrates a typical computer vision pipeline for using DVS Events from the DVS, i.e., using events captured by the sensor. According to the block diagram illustrated in FIG. 2, there is Spatio-Temporal Representation of DVS Events. The DVS images are formed through accumulation of motion-compensated DVS events as a part of the DVS representation. Further, there are DVS Feature-Extraction and Tracking blocks for detecting features in the images. For such purpose, there are employed Computer-Vision Algorithms based on Tracked DVS features. In the computer vision pipeline for using DVS Events from the sensor, the Spatio-Temporal Representation of DVS Events through event-image may be preferred (merely as an example) for compatibility of operation with state of the art image processing algorithms for feature detection and tracking.

FIG. 3 illustrates DVS Events Representation, according to an related art technique. According to the illustration in FIG. 3, the DVS Event e(x,y, t,p) occurs when:

$$I(x,y,t) - I(x,y,t-\Delta t) \geq p \cdot C$$

where
C is the predefined Contrast Sensitivity Threshold
I is the logarithm of Intensity.

Moreover, FIG. 3 show a graph, which indicates DVS Event Accumulation in SLAM. The graph has DVS frames at different time intervals, where the lighter lines are DVS Event times and the darker lines are DVS Image Creation times. Further, FIG. 3 show that there is image representation of DVS events through accumulation of motion-compensated DVS events. After doing motion compensation, a DVS frame can be represented in 2 ways—Surface of Active Events or using a DVS Event Image. Further, there is Address Event Representation (AER) for every DVS event that has a 4 element vector {x,y,t,p}, mentioning the location (x,y), timestamp (t) and the polarity (p) of the event.

FIG. 4 illustrates a DVS stream used in the SLAM, according to a related art technique. FIG. 4 illustrates SLAM bundle adjustment where the mapping infers the 3D structure and localization infers the DVS camera motion. Further, FIG. 4 shows a multimodal SLAM flow diagram, in which, the windowed bundle adjustment minimizes the CIS Re-projection Error, DVS Re-projection Error and the IMU (Inertial Measurement Unit) Error. As such the accuracy of DVS Feature Tracking affects the bundle adjustment cost function and the accuracy of the SLAM algorithm.

Accordingly, there exists a need to overcome one or more problems of the existing solution and improve the DVS features for accurate computer vision applications.

SUMMARY

According to an aspect of the disclosure, there is provided a method of imaging an event captured by a dynamic vision sensor (DVS) camera, said method comprising: receiving one or more events captured by the DVS camera over a period of time; and non-linearly incrementing a motion-compensated pixel location of each of the one or more events by: segregating the motion-compensated pixel location of each of the one or more events into one or more groups, each of the one more groups corresponding to a range of number of events occurring at the motion-compensated pixel locations; and incrementing pixel-intensity for the one or more groups by different amounts to non-linearly increment pixel intensities.

According to another aspect of the disclosure, there is provided a method of imaging an event captured from dynamic vision camera, said method comprising: receiving one or more events captured by an event-camera over a period of time; determining the one or more events as a weighted linear-combination of polar and non-polar components; determining polarity in a single channel frame by: converting both the polar and the non-polar components as intermediate RGB color-channels; and generating the single channel frame by converting the RGB color channels to grayscale.

According to another aspect of the disclosure, there is provided a method of imaging an event captured from dynamic vision camera, said method comprising: receiving one or more events captured from an event-camera over a period of time; obtaining a dynamic vision sensor (DVS) event density distribution with respect to the one or more received events and gathering initial contrast values associated with the one or more events based on a plurality of event densities within the distribution; performing a contrast stretching with respect to the one or more events by non-linearly increasing the initial contrast values by: grouping pixel densities within the distribution into one or more groups; and incrementing the initial contrast values associated with the pixel densities by different amounts based on the one or more groups to result into a plurality of target contrast values.

According to another aspect of the disclosure, there is provided a system for imaging event captured from dynamic vision camera, the system comprising: an event-camera configured to capture one or more events over a period of time; and an image processing system configured to non-linearly incrementing (604) a motion-compensated pixel location of each of the one or more events by: segregating the motion-compensated pixel location of each of the one or more events into one or more groups, each of the one more groups corresponding to a range of number of events occurring at the motion-compensated pixel locations; and incrementing pixel-intensity for the one or more groups by different amounts to non-linearly increment pixel intensities.

According to another aspect of the disclosure, there is provided a system for imaging event captured from dynamic vision camera, the system comprising: an event-camera configured to capture one or more events over a period of time; and an image processing system configured to: determine the one or more events as a weighted linear-combination of polar and non-polar components; and determine polarity in a single channel frame by: converting both the polar and the non-polar components as intermediate RGB color-channels; and generating the single channel frame by converting the RGB color channels to grayscale.

According to another aspect of the disclosure, there is provided a system for imaging event captured from dynamic vision camera, the system comprising: an event-camera configured to capture one or more events over a period of time; and an image processing system configured to: obtaining a dynamic vision sensor (DVS) event density distribution with respect to the one or more received events and gathering initial contrast values associated with the one or more events based on a plurality of event densities within the distribution; performing a contrast stretching with respect to the one or more events by non-linearly increasing the initial contrast values by: grouping the pixel densities within the distribution into one or more groups; and incrementing the initial contrast values associated with the pixel densities by different amounts based on the one or more groups to result into a plurality of target contrast values.

According to another aspect of the disclosure, there is provided a dynamic vision sensor (DVS) device comprising: a memory storing one or more instructions; and a processor configured to execute the one or more instructions to: receive one or more events captured by a DVS camera; process the one or more events based on at least one of: a non-linear mapping of the one or more events; single channel polar DVS representation of the one or more events; and event-density based adaptive normalization of the one or more events; and perform extraction and tracking on the processed one or more events; and apply computer vision algorithms based on the tracked one or more events.

According to another aspect of the disclosure, there is provided a dynamic vision sensor (DVS) method comprising: receiving one or more events captured by a DVS camera; processing the one or more events based on at least one of: a non-linear mapping the one or more events; single channel polar DVS representation of the one or more events; and event-density based adaptive normalization of the one or more events; and performing extraction and tracking on the processed one or more events; and applying computer vision algorithms based on the tracked one or more events.

According to another aspect of the disclosure, there is provided a non-transitory computer readable storage medium having stored thereon a program for performing a dynamic vision sensor (DVS) method comprising: receiving one or more events captured by a DVS camera; processing the one or more events based on at least one of: a non-linear mapping the one or more events; single channel polar DVS representation of the one or more events; and event-density based adaptive normalization of the one or more events; and performing extraction and tracking on the processed one or more events; and applying computer vision algorithms based on the tracked one or more events.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

DETAILED DESCRIPTION OF FIGURES

Figure 1:
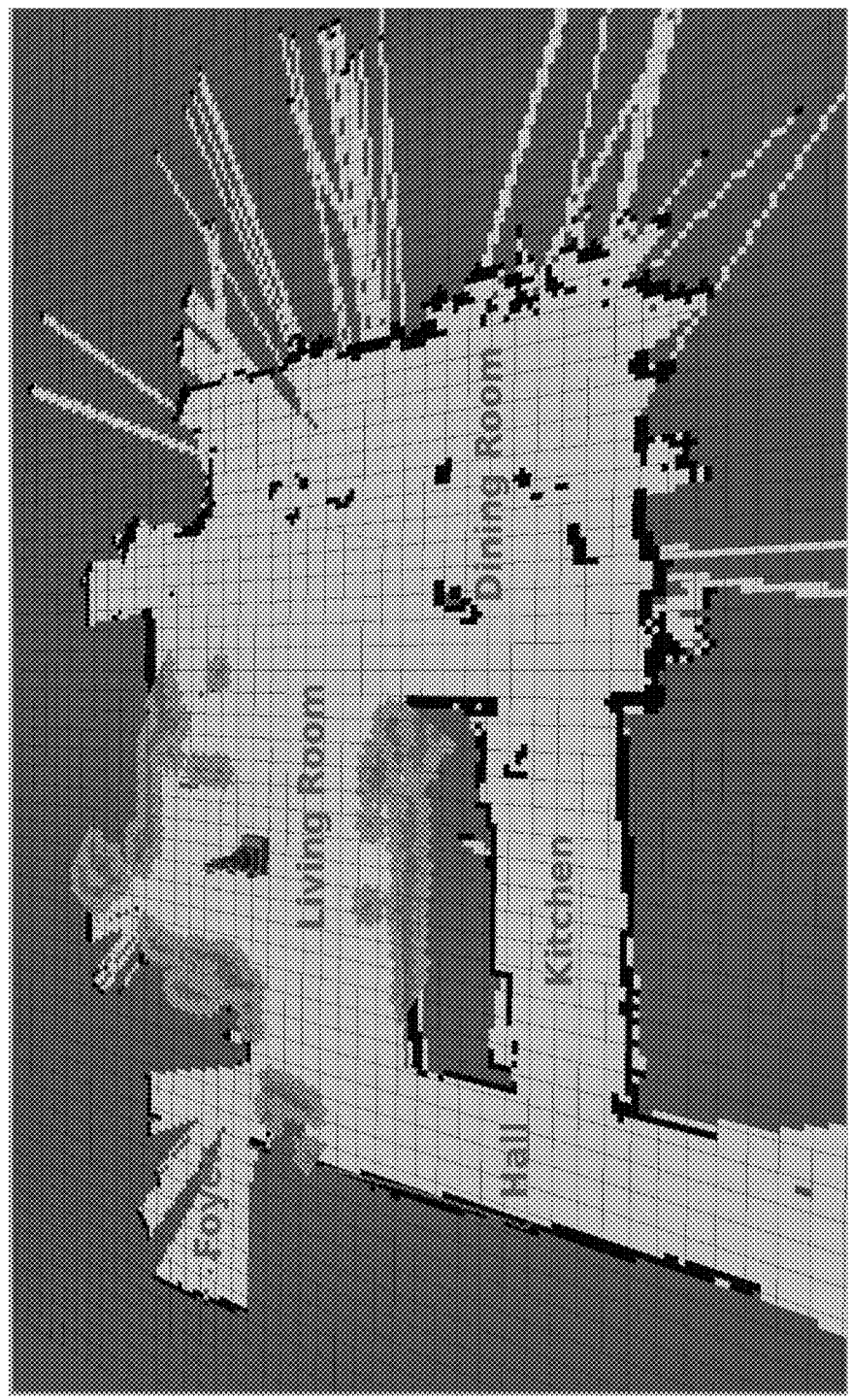
FIG. 1 illustrates an implementation of computer-vision application SLAM.
Figure 2:
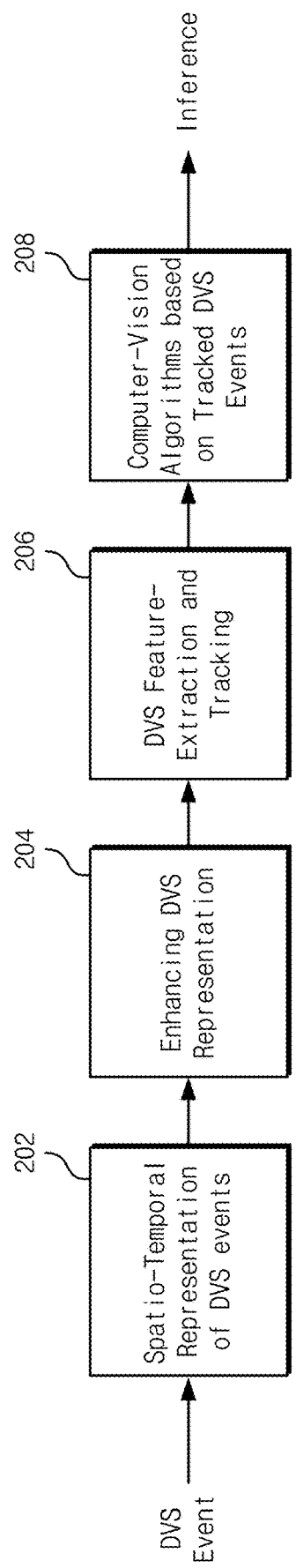
FIG. 2 illustrates a computer vision pipeline for using DVS Events from a sensor.
Figure 3:
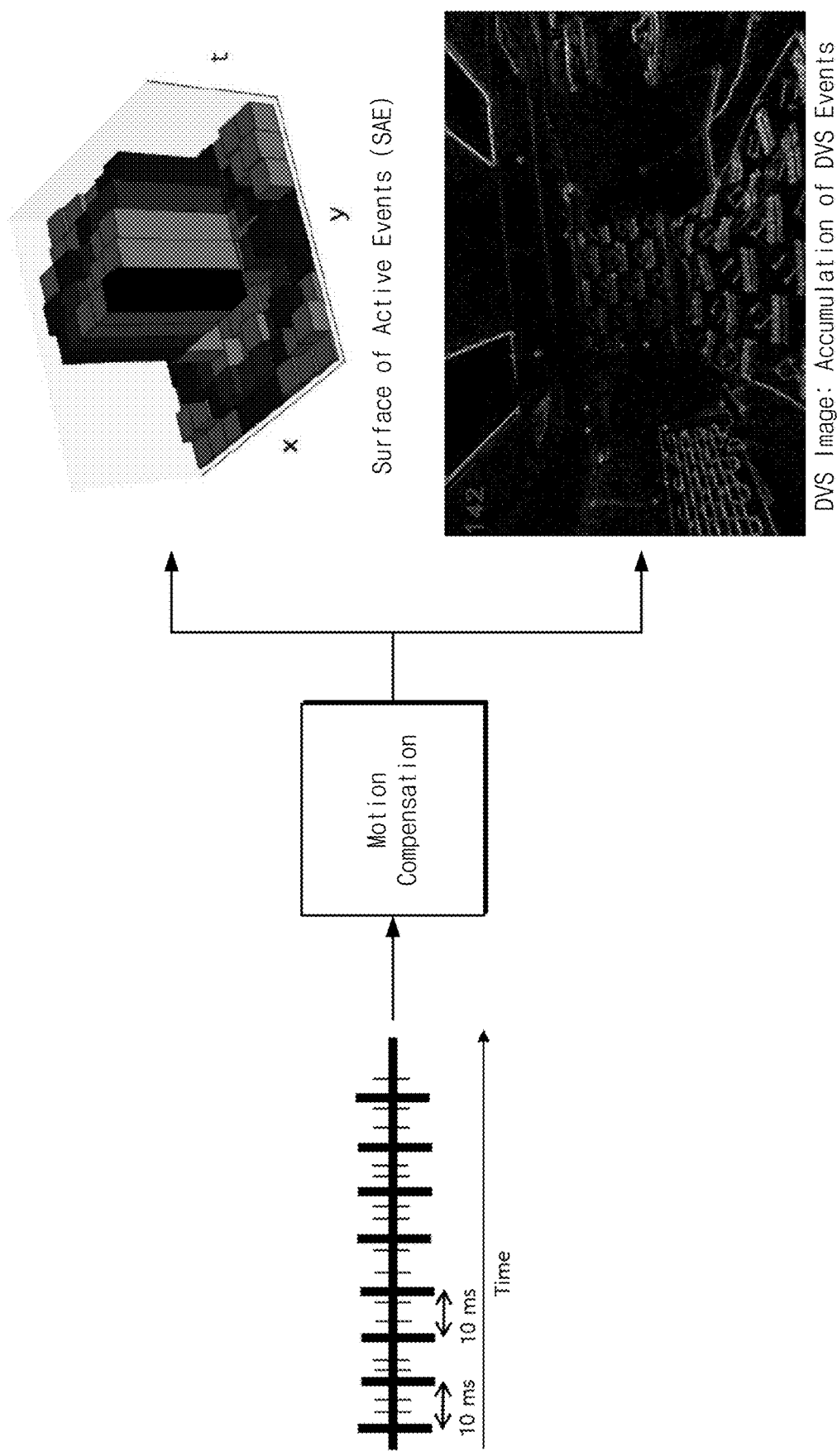
FIG. 3 illustrates a representation of DVS Events.
Figure 4:
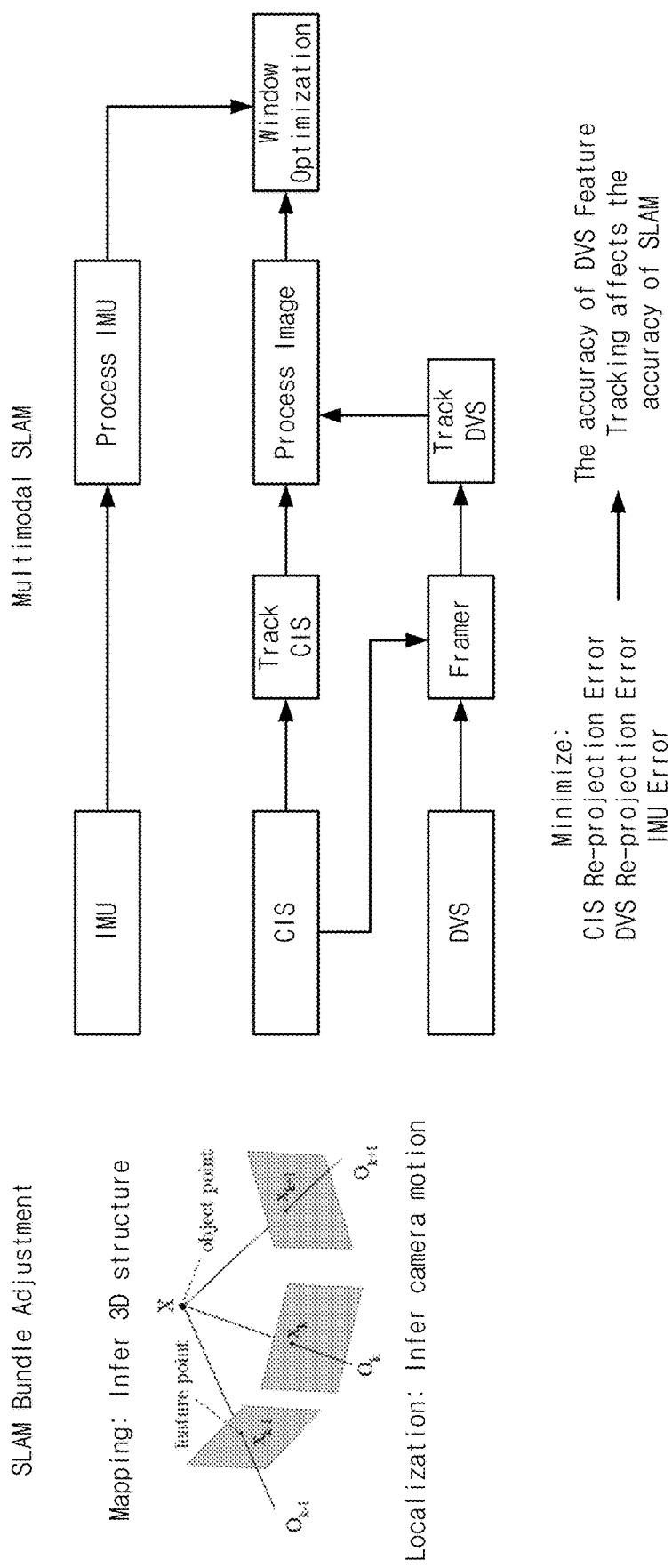
FIG. 4 illustrates a DVS stream used in the SLAM.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all technical and scientific terms used herein have the same meaning as commonly understood by one of ordinary skilled in the art to which this invention belongs. The system, methods, and examples provided herein are illustrative only and not intended to be limiting.

The methods disclosed in the disclosure may be used in any device employing a DVS camera or event camera for Computer Vision applications. Examples of computer Vision applications include, but not limited to, SLAM for Augmented Reality glass, SLAM for Augmented Reality in mobile phones, SLAM and 3D Reconstruction for Autonomous Driving, Fast Eye-tracking for Gaze Prediction, and Frame rate up-conversion.

Figure 5:
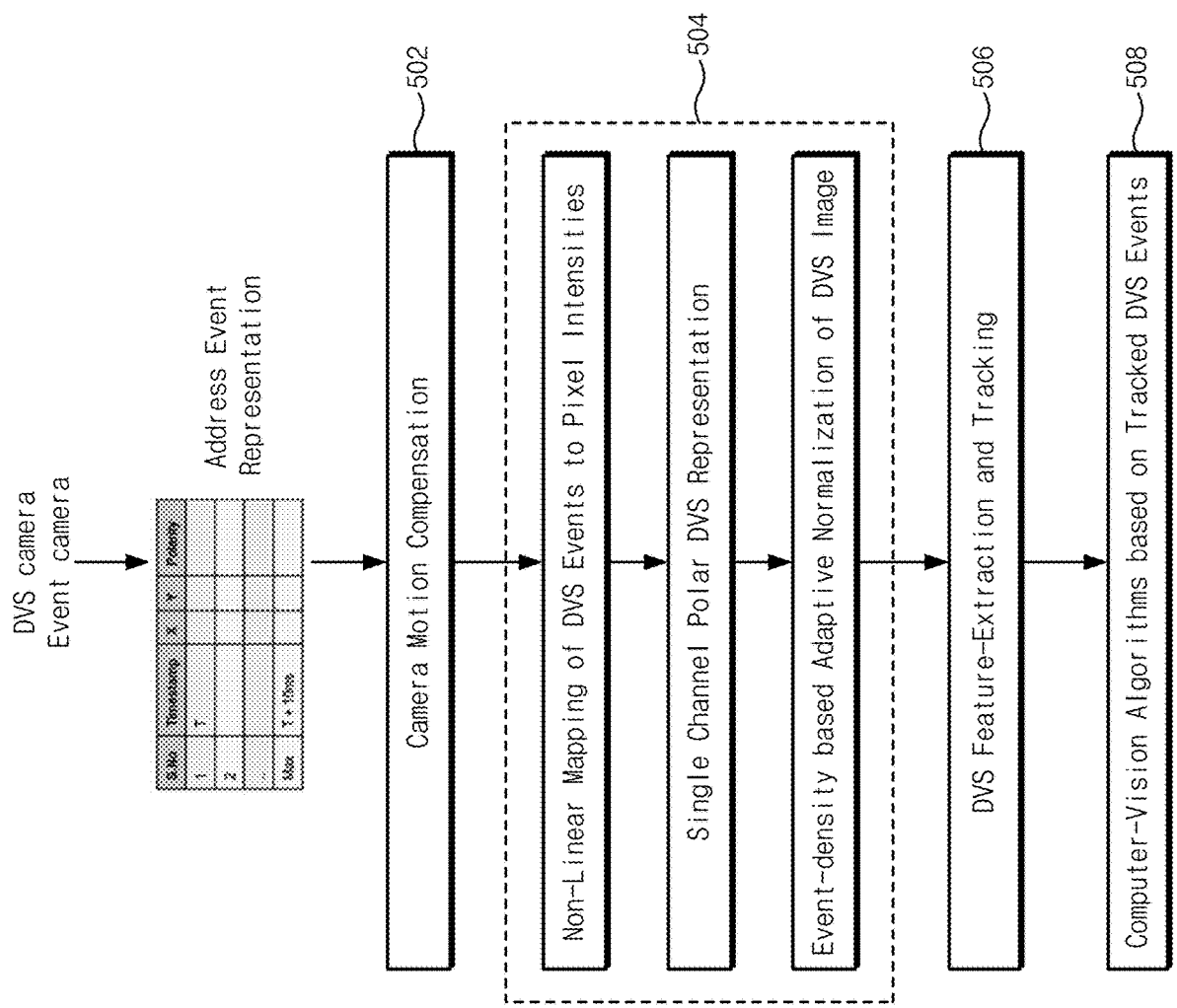
FIG. 5 illustrates a computer vision pipeline for using DVS Events from the sensor, according to an example embodiment.

FIG. 5 illustrates a computer vision pipeline 500 for using DVS Events from DVS sensor, according to an example embodiment of the disclosure.

At operation 502, the captured DVS events are accumulated at motion-compensated pixel-locations of an image.

At operation 504, a Spatio-Temporal image representation of the captured DVS Events is performed. According to an example embodiment, the spatio-Temporal Representation of DVS Events may be performed by at least one of a non-linear mapping of events to DVS frames as described FIG. 6. Further, according to an example embodiment, an enhancement in the DVS representation may be performed by representing polarity in single-channel DVS Frame and by using event density-based contrast stretching.

At operation 506, a DVS Feature-Extraction and Tracking is performed over the processed and enhanced image representation of the DVS representation obtained from operation 504.

At operation 508, computer-vision algorithms are applied based on the tracked DVS Events. According to an example embodiment, related art computer-vision algorithms may be applied.

Considering example of SLAM bundle Adjustment, there is minimization in CIS Re-projection Error, DVS Re-projection Error, and IMU Error. According to solution of the example embodiment, the DVS feature improvements may be measured by DVS SLAM accuracy.

Figure 6A:
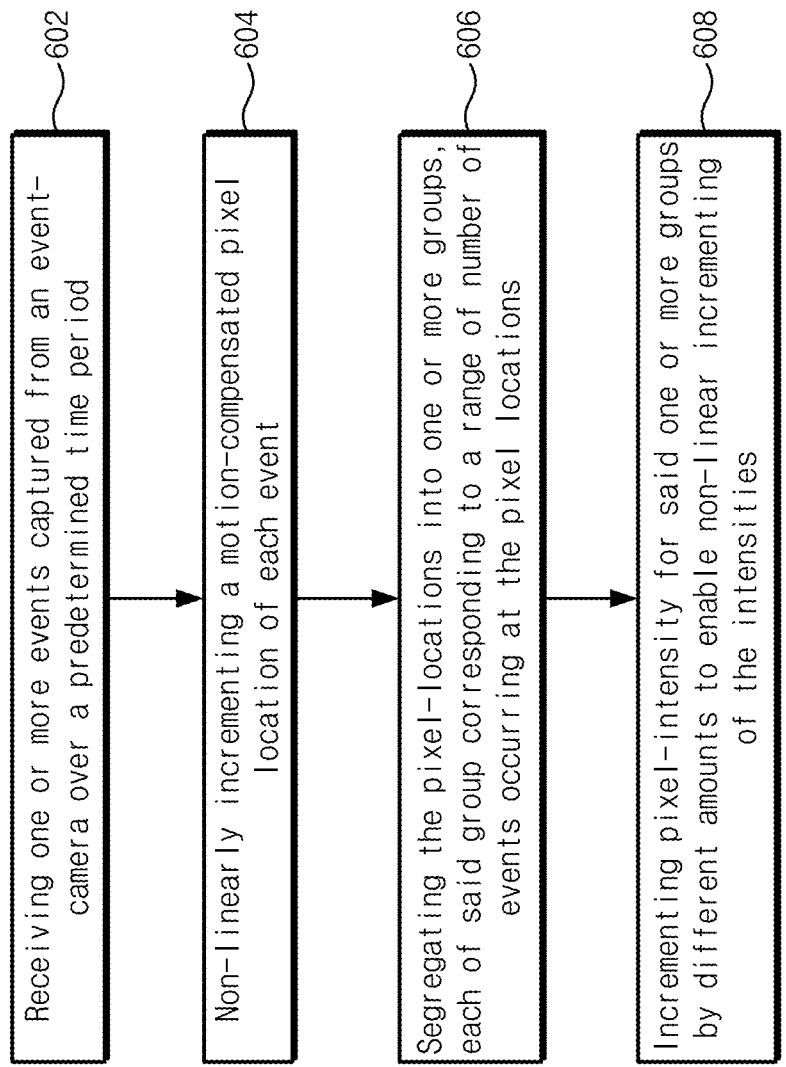
FIG. 6A illustrates a method of imaging an event captured from dynamic vision camera according to an example embodiment.

FIG. 6A illustrates a method of imaging an event captured from dynamic vision camera according to an example embodiment. According to an example embodiment illustrated in FIG. FIG. 6A, the method includes performing a non-linear mapping of DVS events to DVS pixel intensities. The method includes receiving (602) one or more events captured from an event-camera over a period of time. According to an example embodiment, the period of time may be predetermined. A motion-compensated pixel location of each event is non-linearly incremented (604) based on segregating (606) the pixel-locations into one or more groups. According to an example embodiment, each of said group may correspond to a range of number of events occurring at the pixel locations. Thereafter, pixel-intensity for said one or more groups is incremented (608) by different amounts to enable non-linear incrementing of the intensities.

Figure 6B:
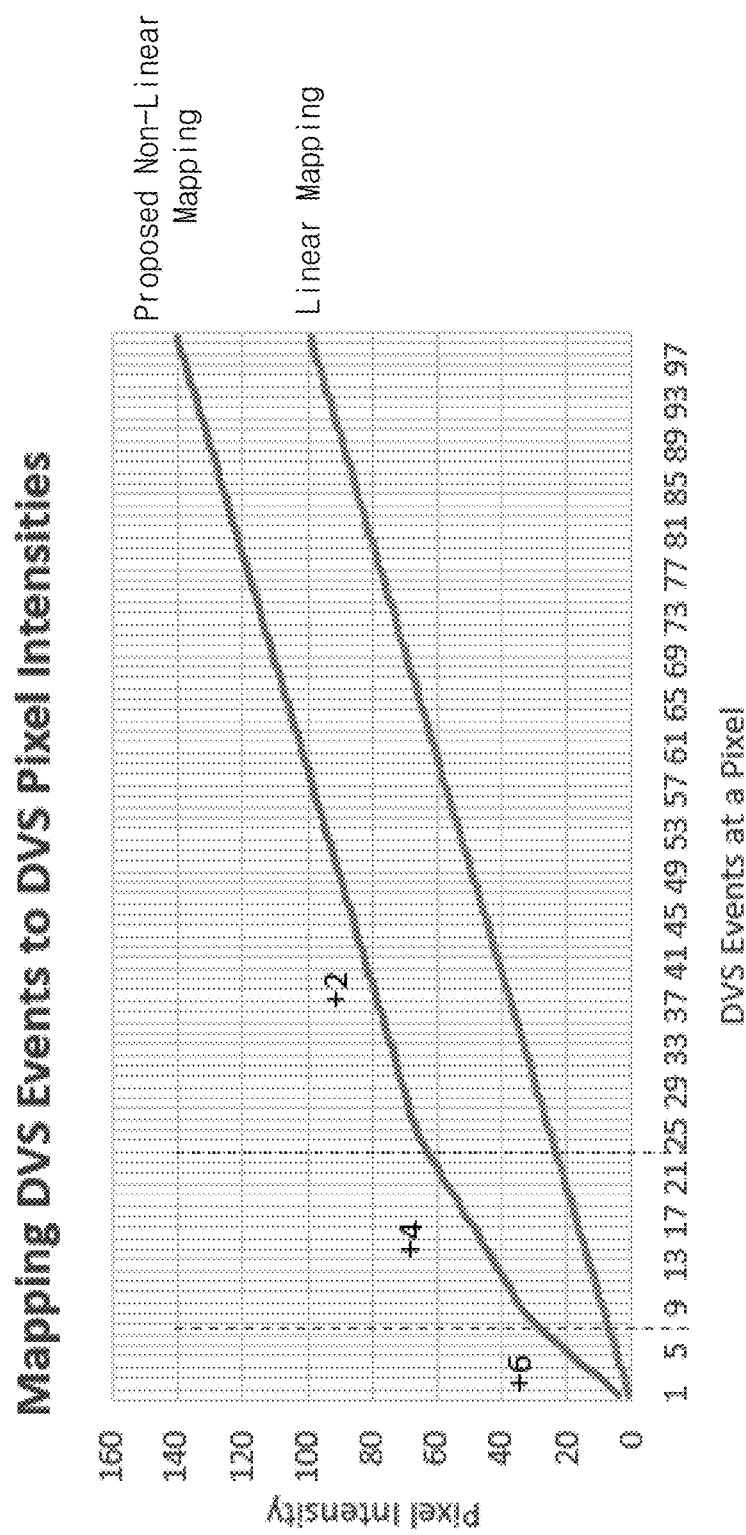
FIG. 6B illustrates a graphical representation of the linear and the non-linear mapping of DVS events to DVS Pixel Intensities, according to an example embodiment.

FIG. 6B illustrates a graphical representation of the non-linear mapping of DVS events to DVS pixel intensities according to the method illustrated in FIG. 6A, according to an embodiment of the disclosure. More specifically, while accumulating DVS events at motion-compensated pixel locations of the DVS image, a non-linear increment is resorted instead of a linear-increment to recover faint-edges.

According to the example embodiment, there is non-linear mapping of motion-compensated DVS events to DVS images. In the non-linear mapping of motion-compensated DVS events to DVS images, the current pixel increments depend on the existing number of accumulated events at that location. Further, the initial events are given a larger weightage to prevent the loss of faint DVS features which are critical for bundle adjustment. In the graphical representation, darker line shows the non-linear mapping of motion-compensated DVS events to DVS images and lighter line shows the linear mapping according to related art.

As shown in the graph, very few DVS events at a pixel may result in insignificant pixel-intensities in a linear mapping and those features may be lost in tracking, and boosting all events by the same factor leads to saturation. However, according to the example embodiment, by performing the non-linear mapping the sparse DVS events are boosted prior to contrast enhancement. Further, since boosting all events by the same factor leads to saturation, the multiplicative factor is reduced at higher pixel intensities. Further, the non-linear mapping of DVS events to pixel intensities is done based on the number of events as indicated in Table 1.

TABLE 1

| Number of DVS Events (k) | DVS Pixel Intensity Increment (p) |
| --- | --- |
| 1-6 | +6*k |
| 7-14 | +4*k |
| >=15 | +2*k |

Thus, in the non-linear mapping boosting faint DVS features results in a larger track-length of features and better geometric structure from bundle adjustment. This helps in cases where there are less number of DVS events generated by moving edges due to pure-rotational motion of camera or due to sudden variations in contrast.

Figure 7:
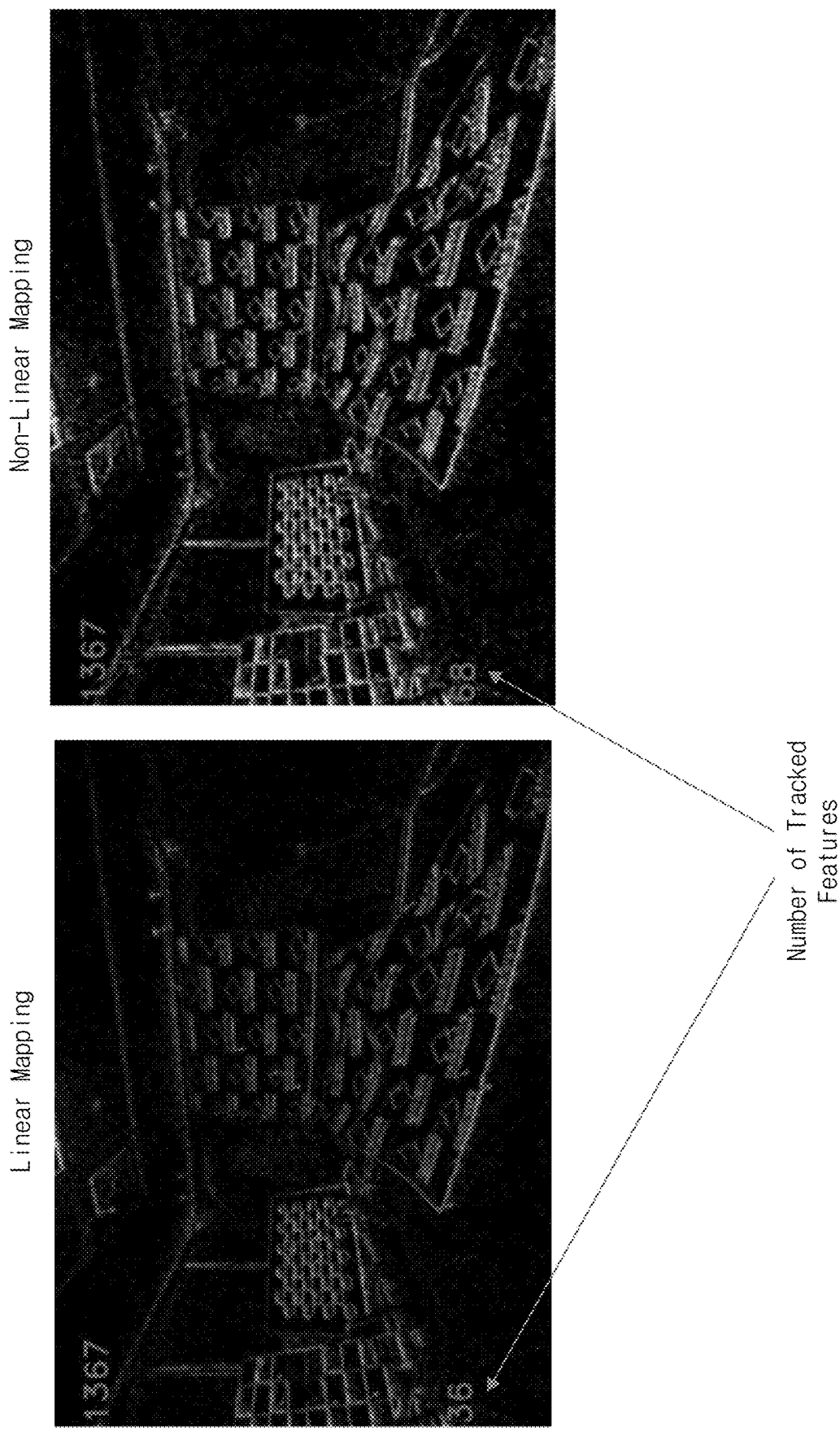
FIG. 7 illustrates images of tracked features across multiple frames using linear and the non-linear mapping of DVS events to DVS Pixel Intensities, according to an embodiment of the present subject matter.

FIG. 7 illustrates images of tracked features across multiple frames using linear and the non-linear mapping of DVS events to DVS Pixel Intensities, according to an example embodiment of the disclosure. The two images in FIG. 7 shows tracked DVS features with related art linear mapping and the non-linear mapping according to the example embodiment. The image 1 shows the linear mapping where the number of DVS features tracked are 36 and image 2 shows the non-linear mapping where the number of DVS features tracked are 68. Thus, there are higher number of tracked-features across multiple frames in case of the non-linear mapping which thus help in better bundle adjustment.

Figure 8A:
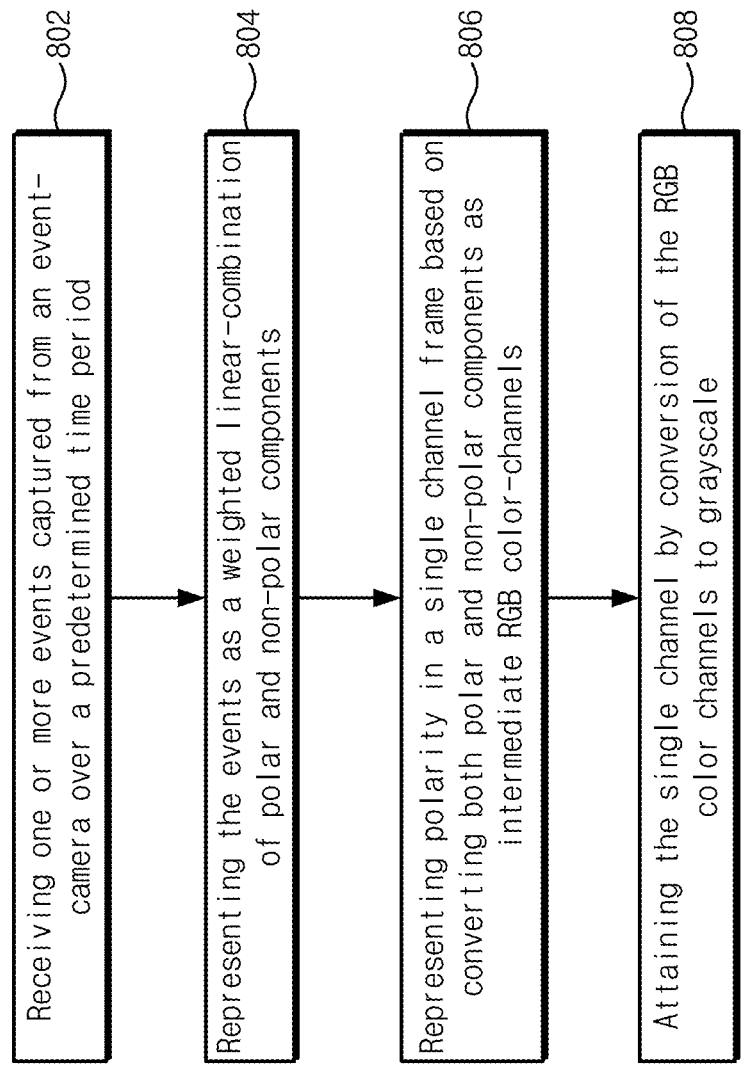
FIG. 8A illustrates a method of imaging an event captured from dynamic vision camera according to another example embodiment.

FIG. 8A illustrates a method of imaging an event captured from dynamic vision camera according to an example embodiment. The method includes receiving (802) one or more events captured from an event-camera over a period of time. According to an embodiment, the period of time may be predetermined. The events are represented (804) as a weighted linear-combination of polar and non-polar components. The polarity is represented (806) in a single channel frame based on converting both polar and non-polar components as intermediate RGB color-channels. The single channel is attained (808) by converting the RGB color channels to grayscale.

Figure 8B:
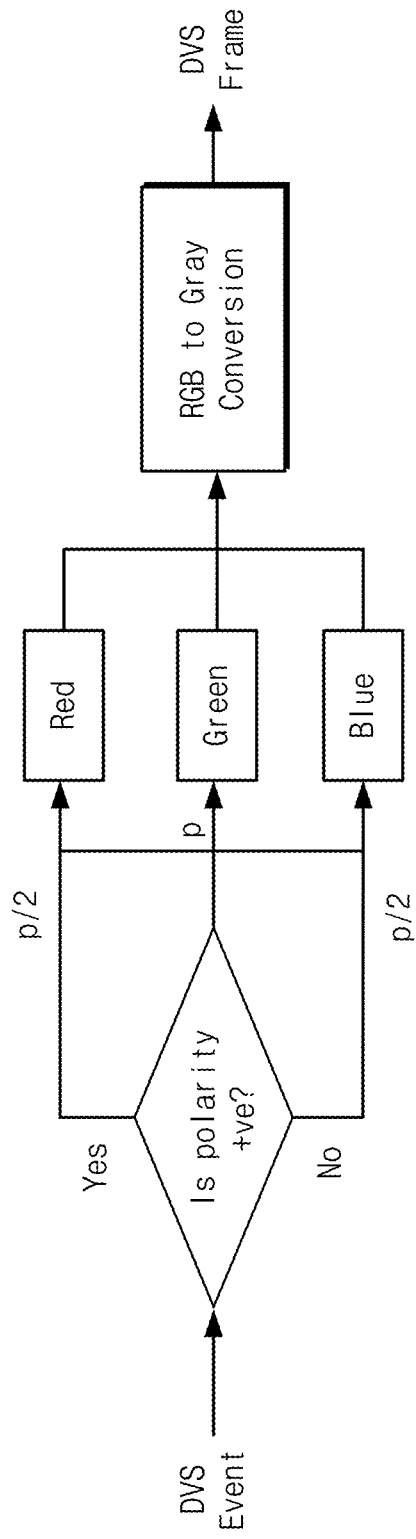
FIG. 8B illustrates a method for representing polarity in single channel DVS Frame according to an example embodiment.

FIG. 8B illustrates the method for representing polarity in single channel DVS Frame, according to an example embodiment of the disclosure and in accordance with the method illustrated in FIG. 8A. According to the example embodiment, the positive and negative DVS events are incremented to red and blue channels of an intermediate buffer before converting the buffer to gray-scale image for feature detection and tracking. The non-polar green channel is incremented for both positive and negative events. The increments on the non-polar channel is twice as that of the polar channel to make the representation robust to motion reversals.

Figure 8C:
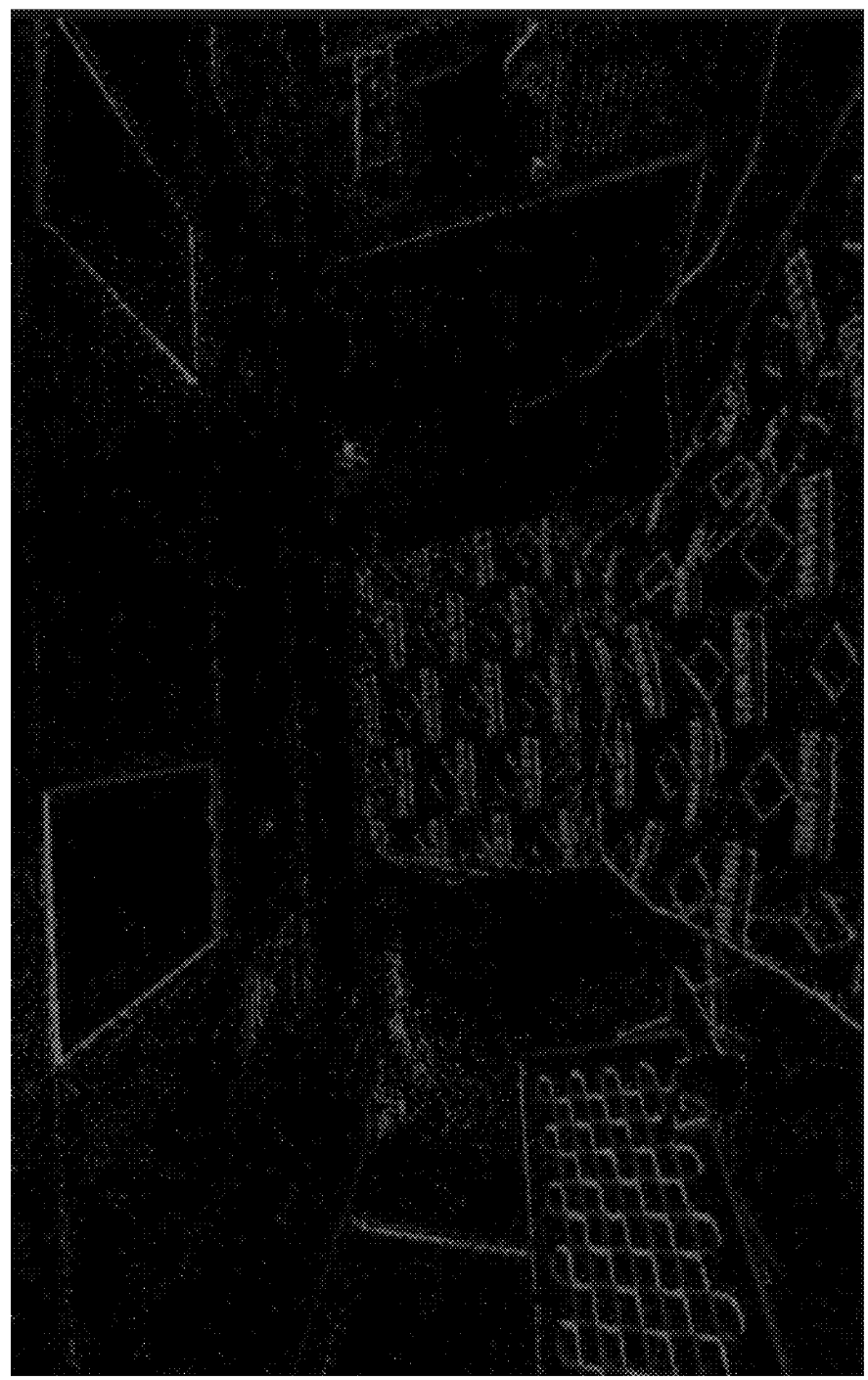
FIG. 8C illustrates a DVS image with only polar R and B channels according to an example embodiment.

FIG. 8C illustrates a DVS image with only polar R and B channels. As the polarity adds additional constraints on feature matching, therefore accurate optical flow is seen in the image. The polarity is represented in Single channel DVS frame.

The polar representation helps in more accurate feature tracking compared to non-polar representation due restriction of search. Further, a single surface is maintained for both positive and negative events instead of 2 surfaces, the same incurs single search and faster optical flow. The polar representation according to the example embodiment with a non-polar G channel is more robust to DVS feature changes due to motion reversals, compared to separate buffers for positive and negative events.

Figure 9A:
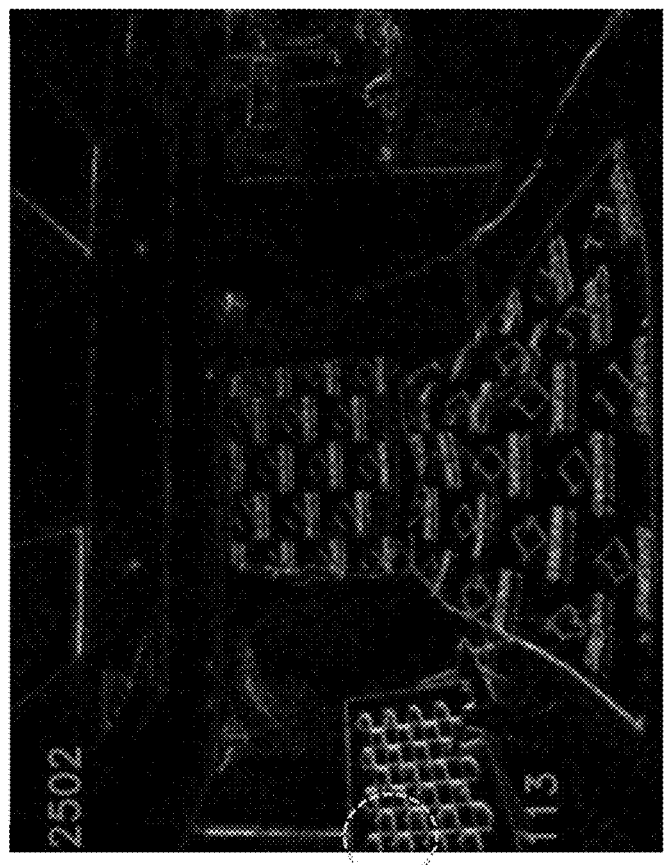
FIG. 9A illustrates non-polar representation and polar representation according to an example embodiment.
Figure 9A:
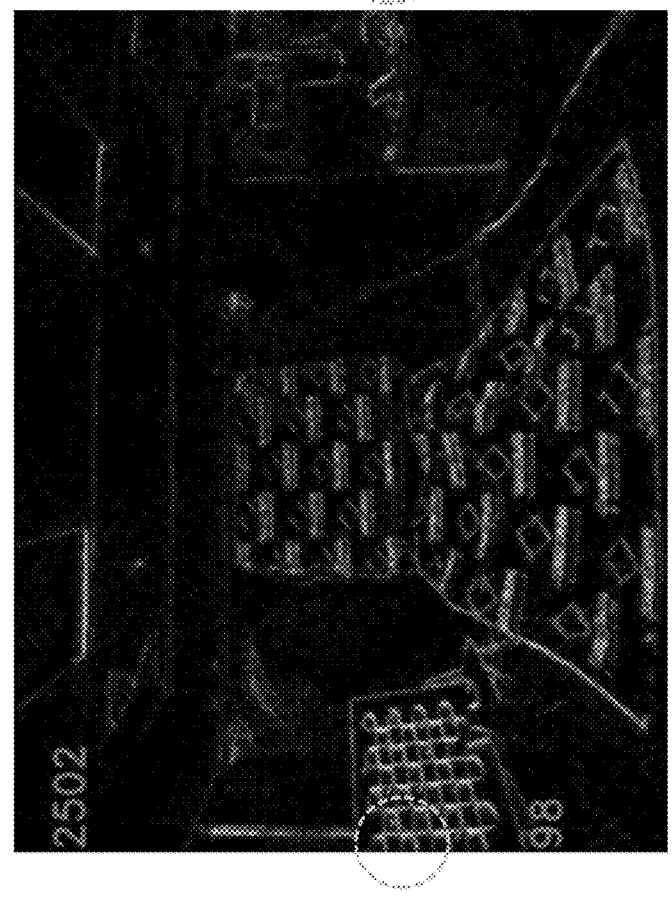

FIG. 9A illustrates non-polar representation and the polar representation, according to an embodiment of the present disclosure. The polar representation is also a gray-scale image because the intermediate RGB representation is transformed into gray-scale. The image 1 shows the non-polar representation where the number of DVS features tracked are 98 and image 2 shows the polar representation where the number of DVS features tracked are 113. Thus, there are higher number of tracked features in case of polar representation and more accurate optical flow in case of repetitive structures in case of polar representation. The polar representation prevents the outlier optical vector as shown in the red-circle.

Figure 9B:
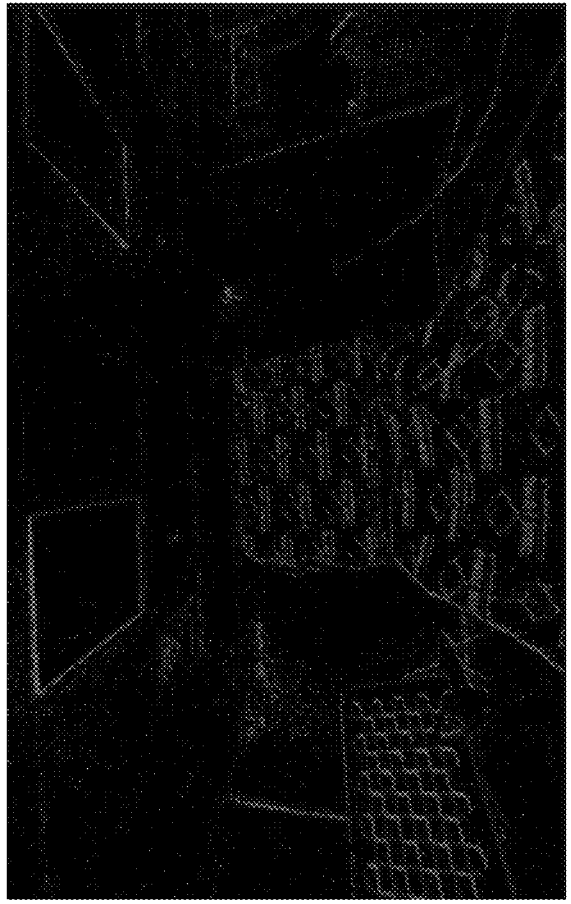
FIG. 9B illustrates a representation of polarity in single Channel DVS Frame.
Figure 9B:
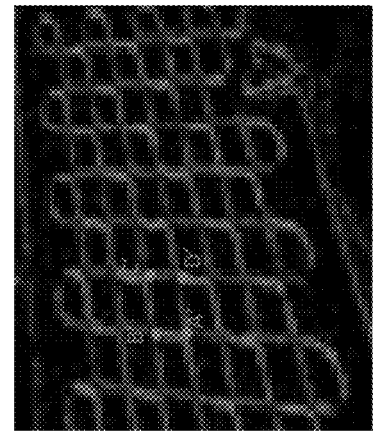
Figure 9B:
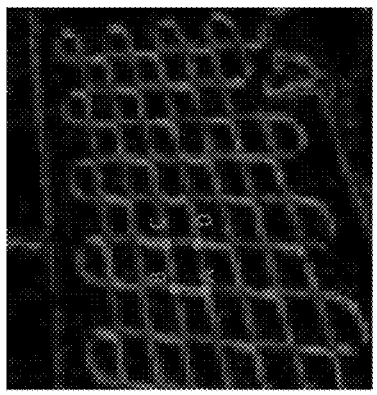

FIG. 9B illustrates representing Polarity in single Channel DVS Frame. Polar representation helps in more accurate feature tracking compared to non-polar representation due restriction of search. This is illustrated through searching for corners in a repetitive pattern. Maintaining a single surface for both positive and negative events instead of 2 surfaces needs single search and faster optical flow. Polarity reverses due to motion reversals and hence the representation flips and tracking is lost. The present subject matter's representation with a non-polar G channel is more robust to DVS feature changes due to motion reversals, compared to separate buffers for positive and negative events.

Figure 10A:
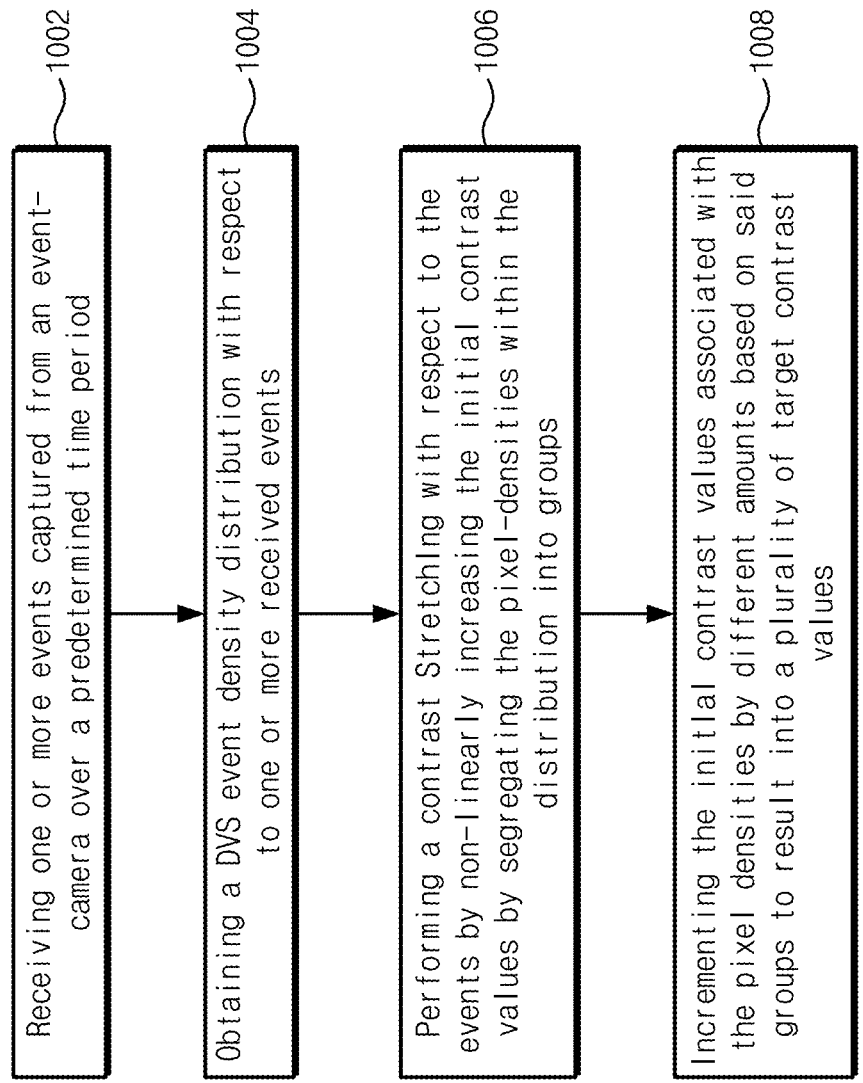
FIG. 10A illustrates a method of imaging an event captured from dynamic vision camera according to another example embodiment.

FIG. 10A illustrates method steps in accordance with yet another embodiment of the present subject matter and refers a method of imaging an event captured from dynamic vision camera. The method includes receiving (1002) one or more events captured from an event-camera over a period of time. According to an embodiment, the period of time may be predetermined. A DVS event density distribution is obtained (1004) with respect to one or more received events and thereby an initial contrast values associated with the events are gathered based on a plurality of event densities within the distribution. Based on the obtained density distribution, a contrast stretching is performed (1006) with respect to the events by non-linearly increasing the initial contrast values. The initial contrast values are increased by: segregating the pixel-densities within the distribution into one or more groups, and incrementing (1008) the initial contrast values associated with the pixel densities by different amounts based on said groups to result into a plurality of target contrast values. The target contrast values corresponds to range of normalized values obtained by non-linearly incrementing the pixel densities within the distribution.

Figure 10B:
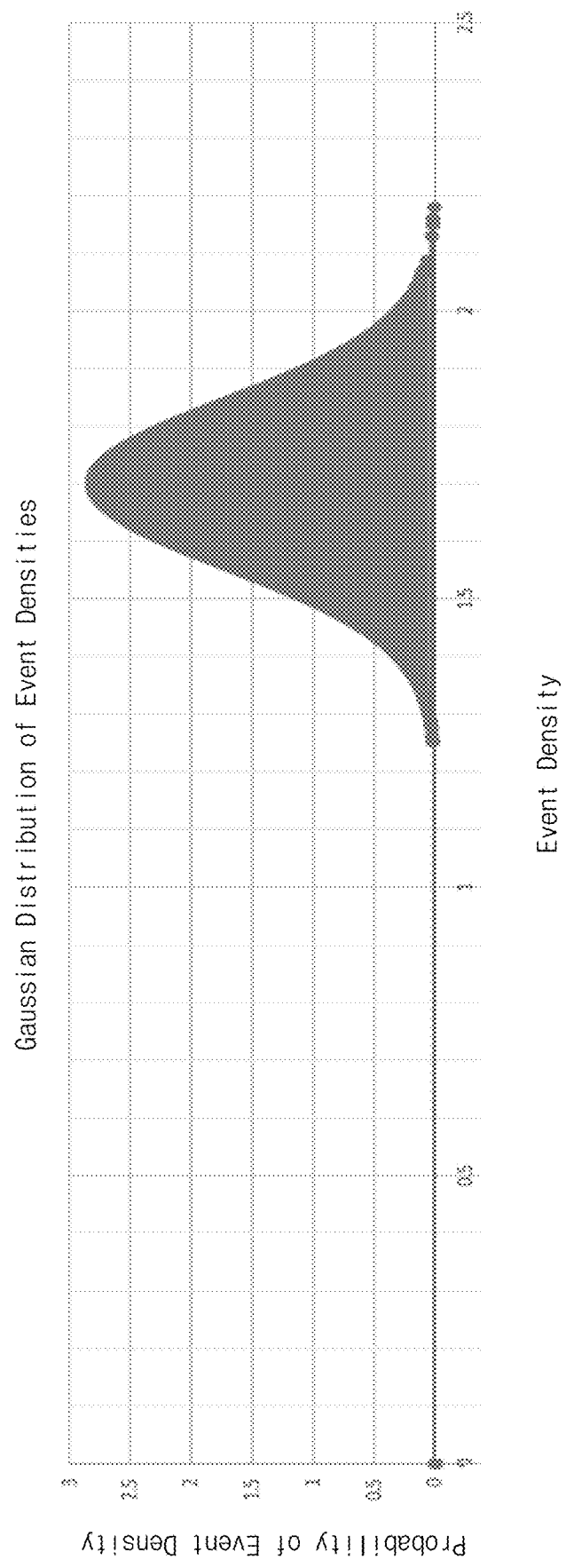
FIG. 10B illustrates Gaussian distribution of event densities as a measure of contrast stretching, according to an embodiment of the present disclosure.

FIG. 10B illustrates Gaussian distribution of event densities as a measure of contrast stretching, according to an embodiment of the present disclosure and in accordance with method illustrated in FIG. 10A. According to said embodiment, the event-density is used as a measure of contrast after DVS event accumulation. The event-density as a Gaussian Probability Density Function (PDF) as indicated in FIG. 10 and depending on the probability of the input event density, the input event density is mapped to a target range for normalization (TRN). This TRN achieves a good trade-off between feature enhancement and noise suppression. The event density captures the initial contrast before normalization:

Event Density($d$)=(#Total Events)/(#Non-zero Event Locations)

Event densities of various sequences followed a Gaussian Distribution with $\mu=1.7$ and $\sigma=0.14$, In said embodiment, the average event densities are mapped to optimal pixel intensities based on best empirical results: (0,90) for medium scale. Further, the multipliers are adjusted for non-average event densities so that normalized contrast of all DVS frames look similar. Table 2 shows mapping of event densities to Target Range for Normalization (TRN). If a pixel location has a value x before contrast stretching, then it is assigned a value, $$y = \frac{TRN}{max\_intensity} x,$$

after contrast stretching, where max_intensity is the maximum pixel-intensity before contrast stretching.

TABLE 2

| EVENT DENSITIES (d) | TARGET RANGE FOR NORMALIZATION (TRN) |
|---|---|
| <1.3 | 60* d |
| 1.4-1.6 | 55*d |
| 1.6-1.8 | 50 * d |
| 1.8-2.0 | 45* d |
| >2.0 | 40* d |

The contrast stretching generally helps in discovering more corner-like features which are based on local image gradients. But a very high contrast enhancement leads to noisy features while a very low enhancement leads to loss of features. So, the event-density based contrast stretching according to the example embodiment adapts the target contrast based on input contrast. Instead of measuring the contrast by local max and min, the DVS event density is used, which is computationally less expensive. Further, instead of linear mapping of event densities to target ranges, a non-linear (piece-wise linear) mapping is used (as explained above) based on the PDF of the event densities, such that DVS pixels in adjacent frames are in a similar range to aid optical flow.

Figure 11:
FIG. 11 illustrates images for handling Noisy DVS Frames, according to an embodiment of the present disclosure.
Figure 11:

FIG. 11 illustrates a normal DVS frame and a Noisy DVS Frame, according to an embodiment of the present disclosure. The image 1 shows a good DVS frame with good contrast stretching having event_density=1.59, TRN from table 2=55*1.59~87 and Max_intensity=24. Further, image 2 shows noisy DVS frame due to spurious events where the contrast stretching reduces the contrast. The DVS image has an event_density of 2.019 and the TRN from Table comes out as 45*2.019~91. But the max_intensity was 102 after non-linear mapping which is higher than TRN. To handle such noisy cases, the following correction is applied when max_intensity>TRN.

TRN_new=2*max_intensity

TABLE 3 indicates the results on Medium Scale Dataset. In an example, the dataset is 4 medium scale test sequences with CIS, DVS and IMU streams with 3000 CIS frames@50 fps. Further, in the example, the Baseline is SIRC-VINS algorithm for SLAM (Jan Baseline)

TABLE 3

| S. No | Configuration | Translation AAPE (cms) | Mean Rotation Error (degrees) | Relative Error (%) |
|---|---|---|---|---|
| 1 | Baseline | 7.613 | 1.248 | 0.160 |
| 2 | Baseline + Restore DVS | 6.720 | 1.282 | 0.119 |
| 3 | Baseline + Restore DVS + Nonlinear Mapping | 6.395 | 1.258 | 0.095 |
| 4 | Baseline + Restore DVS + Nonlinear Mapping + Adaptive Normalization | 6.723 | 1.167 | 0.097 |
| 5 | Baseline + Restore DVS + Nonlinear Mapping + Event Density Based Adaptive Normalization | 6.588 | 1.240 | 0.107 |
| 6 | Baseline + Restore DVS + Nonlinear Mapping + Polar Representation + Event Density Based Adaptive Normalization | 6.543 | 1.048 | 0.095 |
| | Overall Improvements w.r.t Baseline (in percentage) | 14.056 | 15.972 | 40.690 |

TABLE 4 indicates the results on CDVS3 Dataset. In an example, the dataset is 37 test sequences with CIS, DVS and IMU streams with 6000 CIS frames@50 fps. The test cases cover Fast and Gentle motion, HDR and Dark scenarios. Further, in the example, the baseline is SIRC-VINS algorithm for SLAM (May baseline).

TABLE 4

| | SIRC Master Branch + SSIR Changes | | | SIRC Master Branch (Baseline) | | |
|---|---|---|---|---|---|---|
| CDVS3_dataset Categories | Median AAPE (meters) | Median Rotation Error (degrees) | Median Relative Error (%) | Median AAPE (meters) | Median Rotation Error (degrees) | Median Relative Error (%) |
| Fast (16 Seqs) | 0.3306 | 2.0814 | 0.3401 | 0.3518 | 2.1086 | 0.3584 |
| Gentle (6 Seqs) | 0.1399 | 1.8855 | 0.1803 | 0.1335 | 2.1420 | 0.2115 |
| Dark (5 Seqs) | 0.4219 | 2.7357 | 0.6644 | 0.4522 | 2.9433 | 0.5964 |
| HDR (10 seqs) | 0.0399 | 1.2261 | 0.1844 | 0.0394 | 1.3763 | 0.1955 |
| Overall (37 Seqs) | 0.1543 | 1.9330 | 0.2647 | 0.1980 | 2.0370 | 0.2887 |

Thus, it is seen that on the Medium scale dataset of 4 sequences, the method, device and system according to the example embodiment decreased the Translational AAPE, Rotation Error and Relative Error by more than 14%, 15% and 40% respectively w.r.t Jan Baseline. Further, on the CDVS3 dataset of 37 sequences, the method, device and system according to the example embodiment decreased the Translational AAPE, Rotation Error and Relative Error by more than 20%, 5% and 10% respectively w.r.t May Baseline.

The advantages of the disclosed subject matter are that due Non-Linear Mapping of motion-compensated DVS events to DVS Images, boosting of faint DVS features results in a larger track-length of features and better geometric structure from Bundle Adjustment. This helps in cases where there are very a smaller number of DVS events generated by moving edges due to pure-rotational motion of camera or due to sudden variations in contrast. Further, representing polarity in single channel DVS Frame helps in more accurate feature tracking compared to non-polar representation due restriction of search. This representation with a non-polar G channel is more robust to DVS feature changes due to motion reversals, compared to separate buffers for positive and negative events. Further, event density-based contrast-stretching helps in discovering more corner-like features which are based on local image gradients. In the methods of the example embodiment, DVS event density is used, which is computationally less expensive.

The example embodiment of the disclosure may be treated as event camera post-processing block that can be plugged into any Computer Vision System. Experimental results show that the event-camera post-processing block achieves lower DVS SLAM errors compared to the baseline (State-of-the-art VINS Fusion algorithm) on two different example datasets. Likewise, other standard datasets may be also construed to be covered with respect to the present examples. The approach according to an example embodiment is agnostic to the event camera, feature detection and tracking algorithm and also to the actual CV application. Moreover, the example embodiment of the disclosure may help DVS sensor to achieve higher accuracy in Gaming, Augmented reality and Autonomous driving areas.

Figure 12:
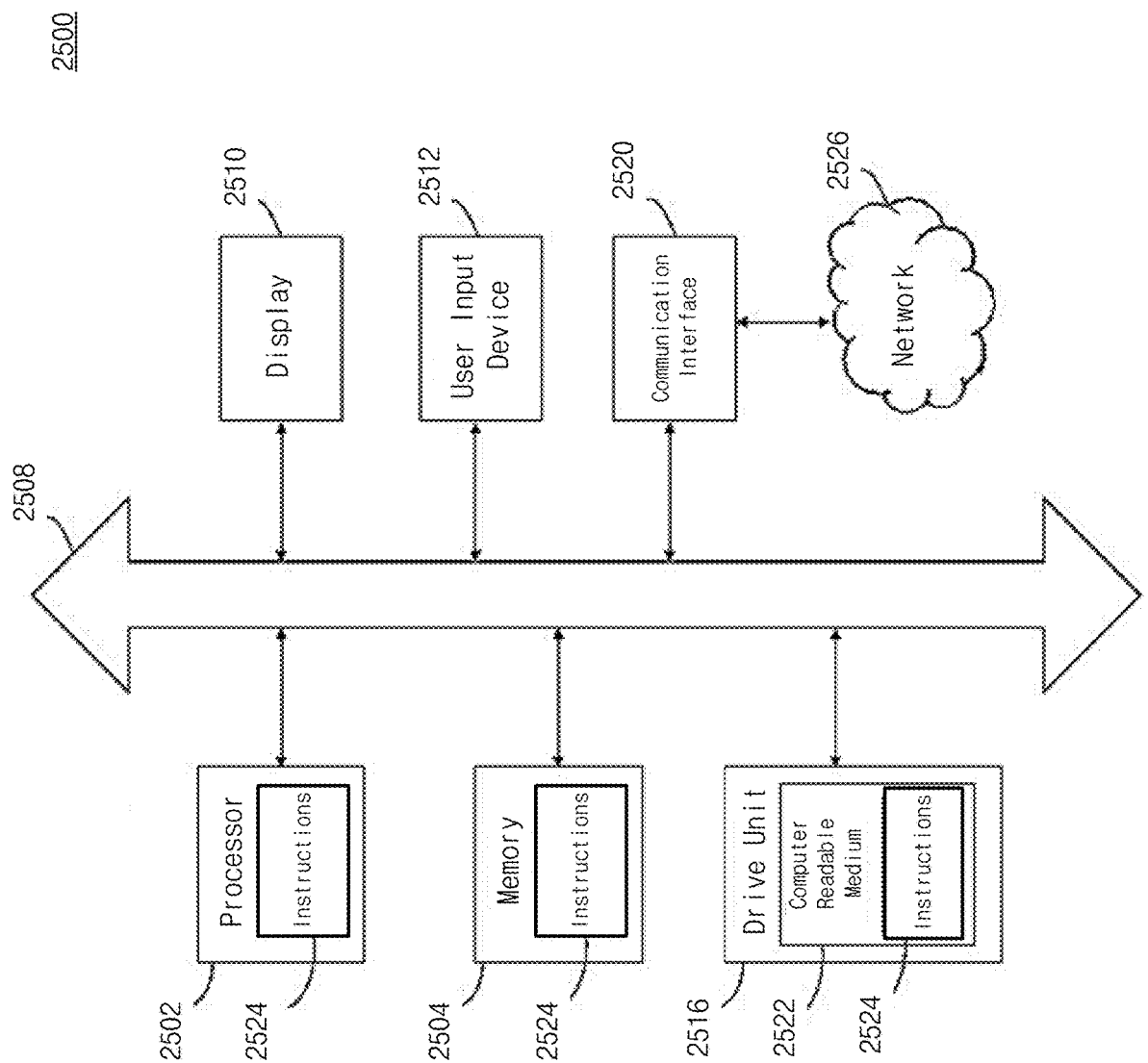
FIG. 12 illustrates a computing device implementation, according to an embodiment of the present disclosure Further, skilled artisans will appreciate that elements in the drawings are illustrated for simplicity and may not have been necessarily been drawn to scale. For example, the flow charts may illustrate the method in terms of the most prominent operations involved to help to improve understanding of aspects of the disclosure. However, the disclosure of the operations in the flowchart should not be considered and limitations on the order of the operations or the performance of other operations. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

FIG. 12 illustrates yet another exemplary implementation in accordance with the example embodiment of the disclosure, and yet another typical hardware configuration of the imaging system and the DVS sensor forming a pipeline 500 of FIG. 5 through a computer system 2500. The computer system 2500 can include a set of instructions that can be executed to cause the computer system 2500 to perform any one or more of the methods disclosed above. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer system 2500 may include an input device 2512 configured to allow a user to interact with any of the components of system 2500. The computer system 2500 may also include a disk or optical drive unit 2516. The disk drive unit 2516 may include a computer-readable medium 2522 in which one or more sets of instructions 2524, e.g. software, can be embedded. Further, the instructions 2524 may embody one or more of the methods or logic as described. In a particular example, the instructions 2524 may reside completely, or at least partially, within the memory 2504 or within the processor 2502 during execution by the computer system 2500.

The disclosure contemplates a computer-readable medium that includes the instructions 2524 or receives and executes the instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or may be a separate component. The communication port 2520 may be created in software or may be a physical connection in hardware. The communication port 2520 may be configured to connect with the network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

According to an example embodiment, the methods illustrated in FIGS. 6A, 8A and 10 may be implemented by a processor such as the processor 2501 shown in FIG. 12. According to an example embodiment, a memory such as the memory 2504 shown in FIG. 12 may store one or more instructions, and the processor may execute the one or more instructions to perform the methods illustrated in FIGS. 6A, 8A and 10.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method of imaging an event captured by a dynamic vision sensor (DVS) camera, said method comprising:
   receiving one or more events captured by the DVS camera over a period of time; and
   non-linearly incrementing a motion-compensated pixel location of each of the one or more events by:
      segregating the motion-compensated pixel location of each of the one or more events into one or more groups, each of the one more groups corresponding to a range of number of events occurring at the motion-compensated pixel locations; and
      incrementing pixel-intensity for the one or more groups by different amounts to non-linearly increment pixel intensities.

2. A system for imaging event captured from dynamic vision camera, the system comprising:
   an event-camera configured to capture one or more events over a period of time; and
   an image processing system configured to non-linearly incrementing (604) a motion-compensated pixel location of each of the one or more events by:
      segregating the motion-compensated pixel location of each of the one or more events into one or more groups, each of the one more groups corresponding to a range of number of events occurring at the motion-compensated pixel locations; and
      incrementing pixel-intensity for the one or more groups by different amounts to non-linearly increment pixel intensities.

3. A dynamic vision sensor (DVS) device comprising:
   a memory storing one or more instructions; and
   a processor configured to execute the one or more instructions to:
      receive one or more events captured by a DVS camera;
      process the one or more events based on at least one of:
         a non-linear mapping of the one or more events;
         single channel polar DVS representation of the one or more events; and
         event-density based adaptive normalization of the one or more events; and
      perform extraction and tracking on the processed one or more events; and
      apply computer vision algorithms based on the tracked one or more events.

4. The DVS device according to claim 3, wherein the processor is further configured to perform the non-linear mapping of the one or more events by non-linearly incrementing a motion-compensated pixel location of each of the one or more events by:
   segregating the motion-compensated pixel location of each of the one or more events into one or more groups, each of the one more groups corresponding to a range of number of events occurring at the motion-compensated pixel locations; and
   incrementing pixel-intensity for the one or more groups by different amounts to non-linearly increment pixel intensities.

5. A dynamic vision sensor (DVS) method comprising:
   receiving one or more events captured by a DVS camera;
   processing the one or more events based on at least one of:
      a non-linear mapping the one or more events;
      single channel polar DVS representation of the one or more events; and
      event-density based adaptive normalization of the one or more events; and
   performing extraction and tracking on the processed one or more events; and
   applying computer vision algorithms based on the tracked one or more events.

6. The DVS method according to claim 5, wherein the non-linear mapping of the one or more events comprises:
   non-linearly incrementing a motion-compensated pixel location of each of the one or more events by:
      segregating the motion-compensated pixel location of each of the one or more events into one or more groups, each of the one more groups corresponding to a range of number of events occurring at the motion-compensated pixel locations; and
      incrementing pixel-intensity for the one or more groups by different amounts to non-linearly increment pixel intensities.

7. A non-transitory computer readable storage medium having stored thereon a program for performing a dynamic vision sensor (DVS) method comprising:
   receiving one or more events captured by a DVS camera;
   processing the one or more events based on at least one of:
      a non-linear mapping the one or more events;
      single channel polar DVS representation of the one or more events; and
      event-density based adaptive normalization of the one or more events; and
   performing extraction and tracking on the processed one or more events; and applying computer vision algorithms based on the tracked one or more events.

8. The non-transitory computer readable storage medium according to claim 7, wherein the non-linear mapping of the one or more events comprises:
  non-linearly incrementing a motion-compensated pixel location of each of the one or more events by:
    segregating the motion-compensated pixel location of each of the one or more events into one or more groups, each of the one more groups corresponding to a range of number of events occurring at the motion-compensated pixel locations; and
    incrementing pixel-intensity for the one or more groups by different amounts to non-linearly increment pixel intensities.

* * * * *